B. F. WILSON.
SHOCK LOADER FOR GRAIN AND HAY.
APPLICATION FILED MAR. 19, 1909.
980,038.
Patented Dec. 27, 1910.
6 SHEETS—SHEET 6.
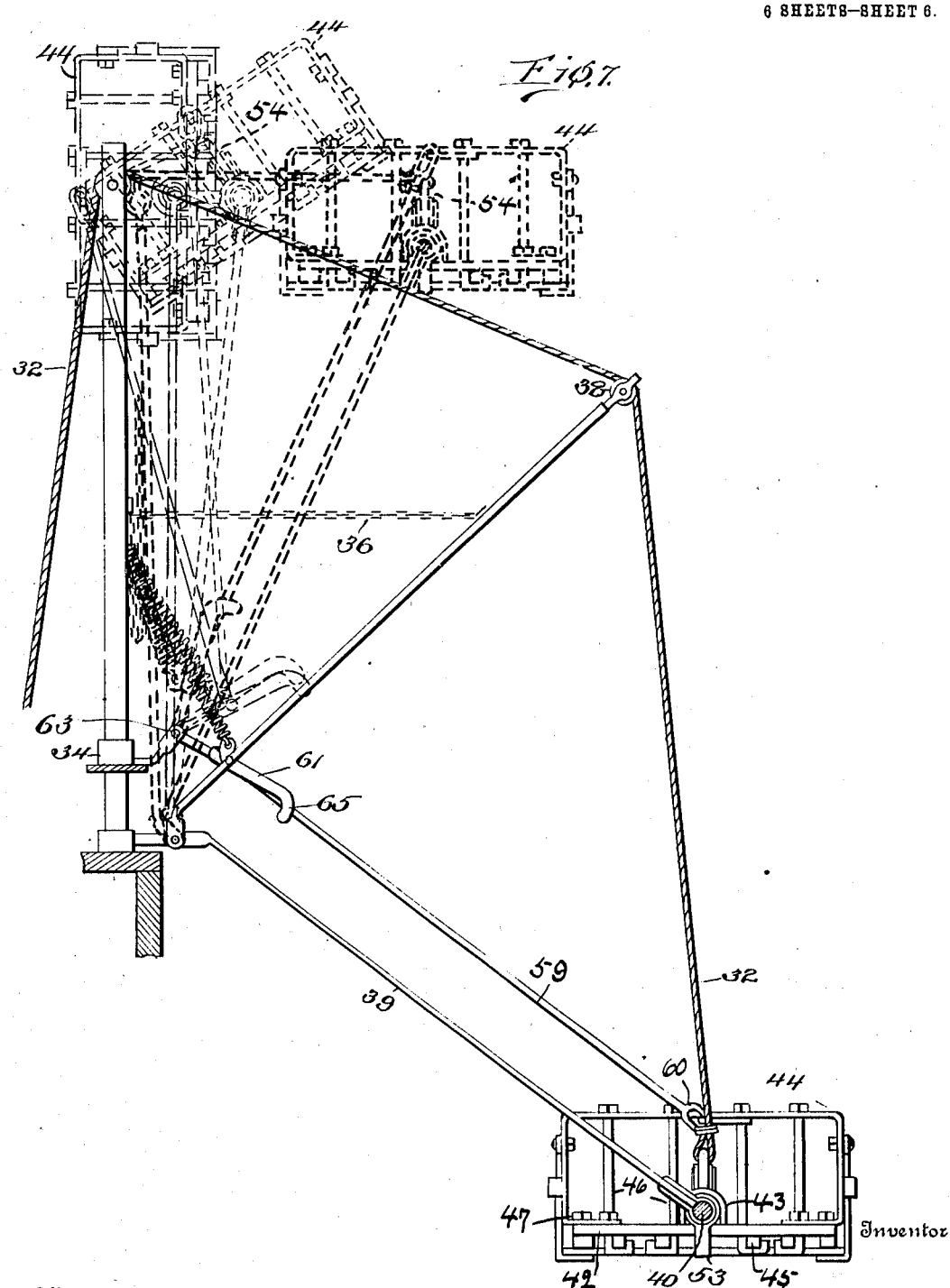

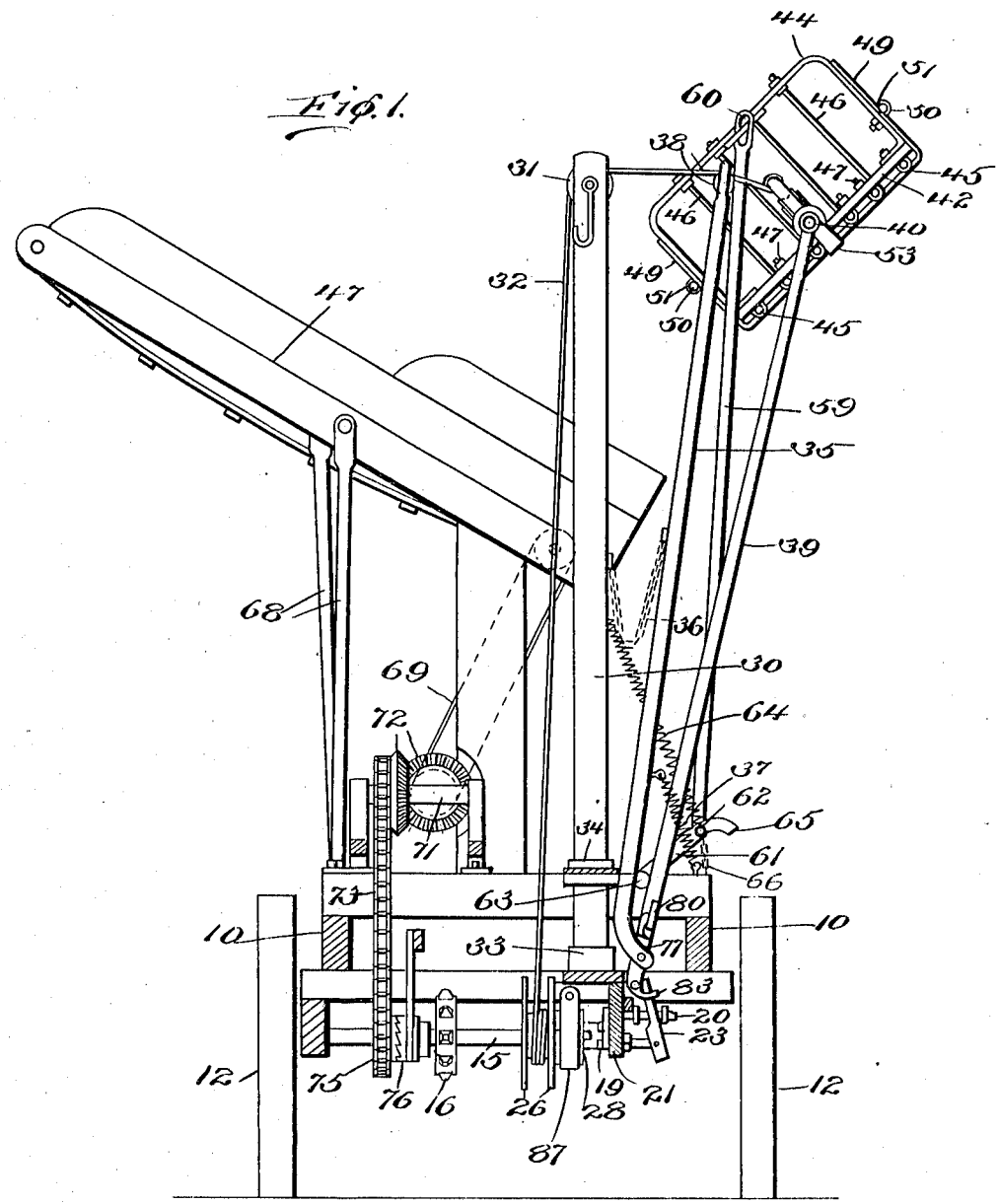

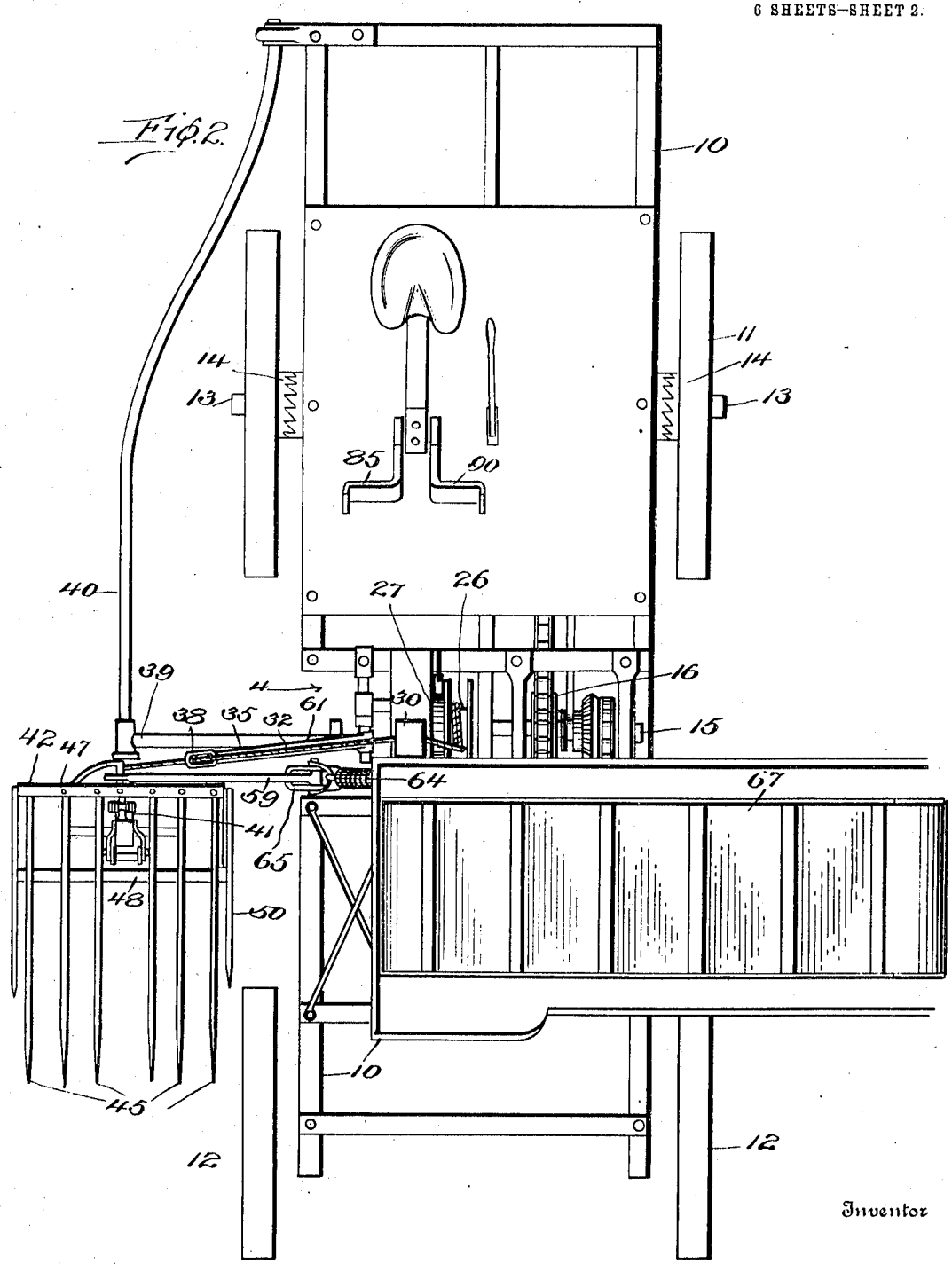

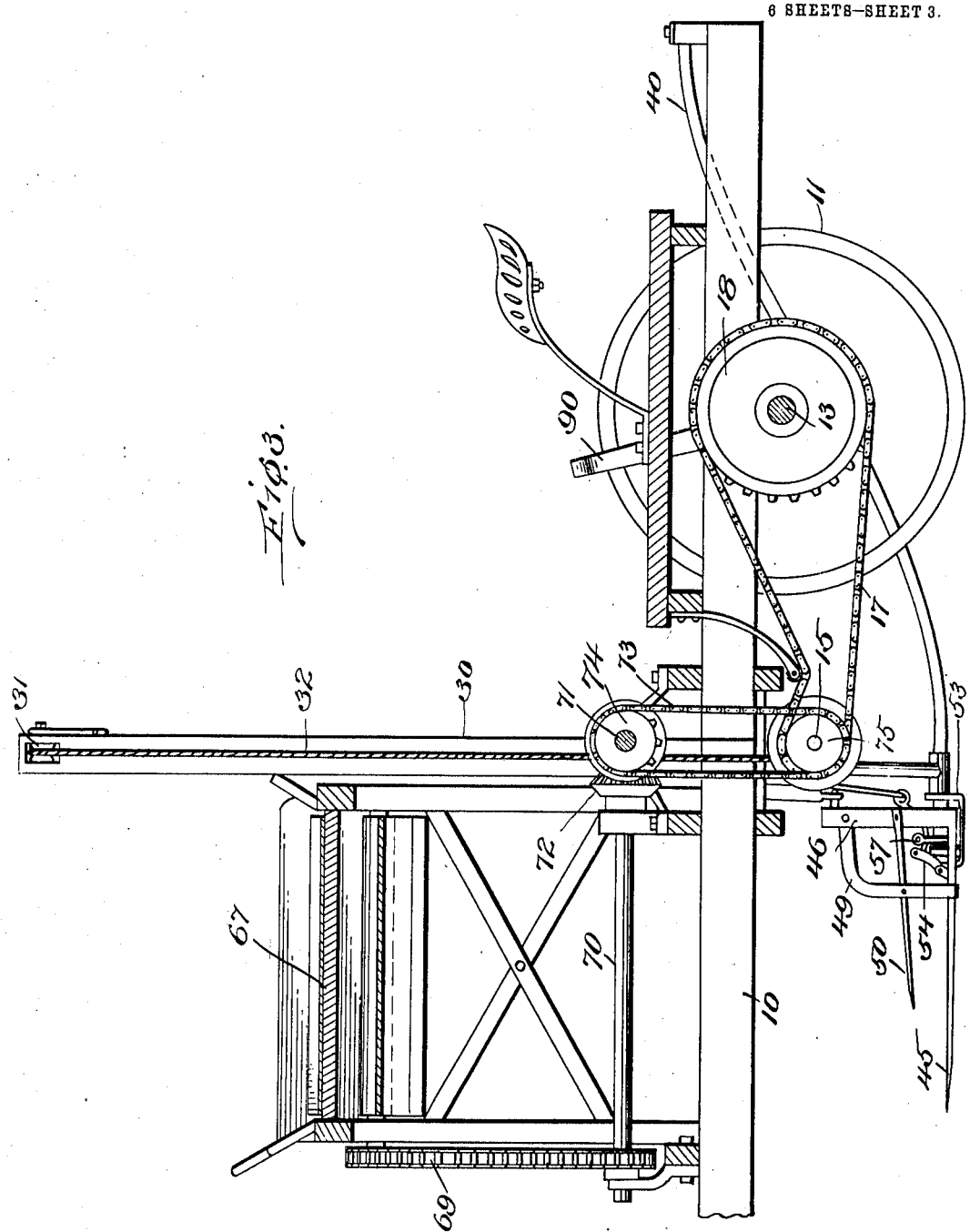

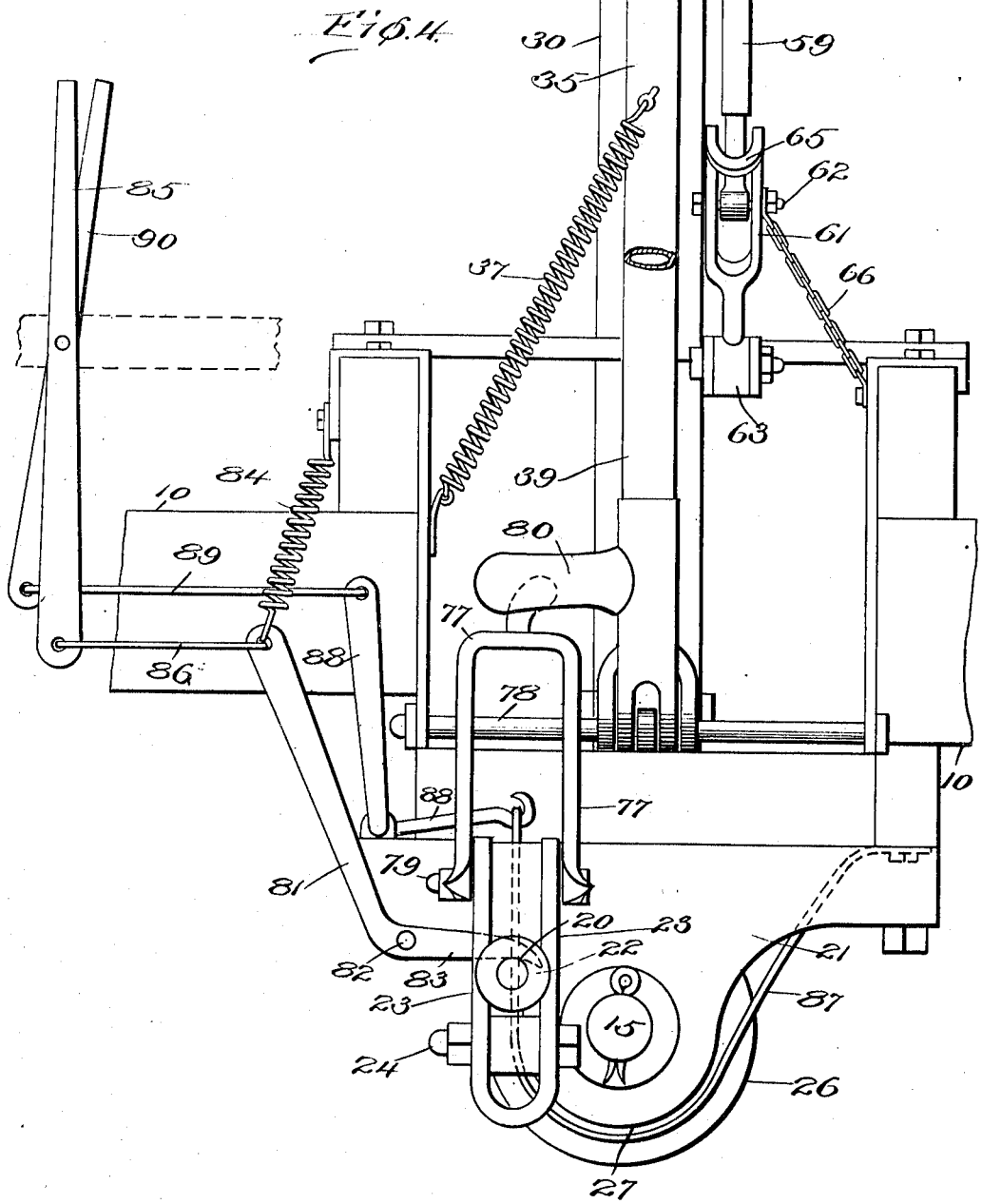

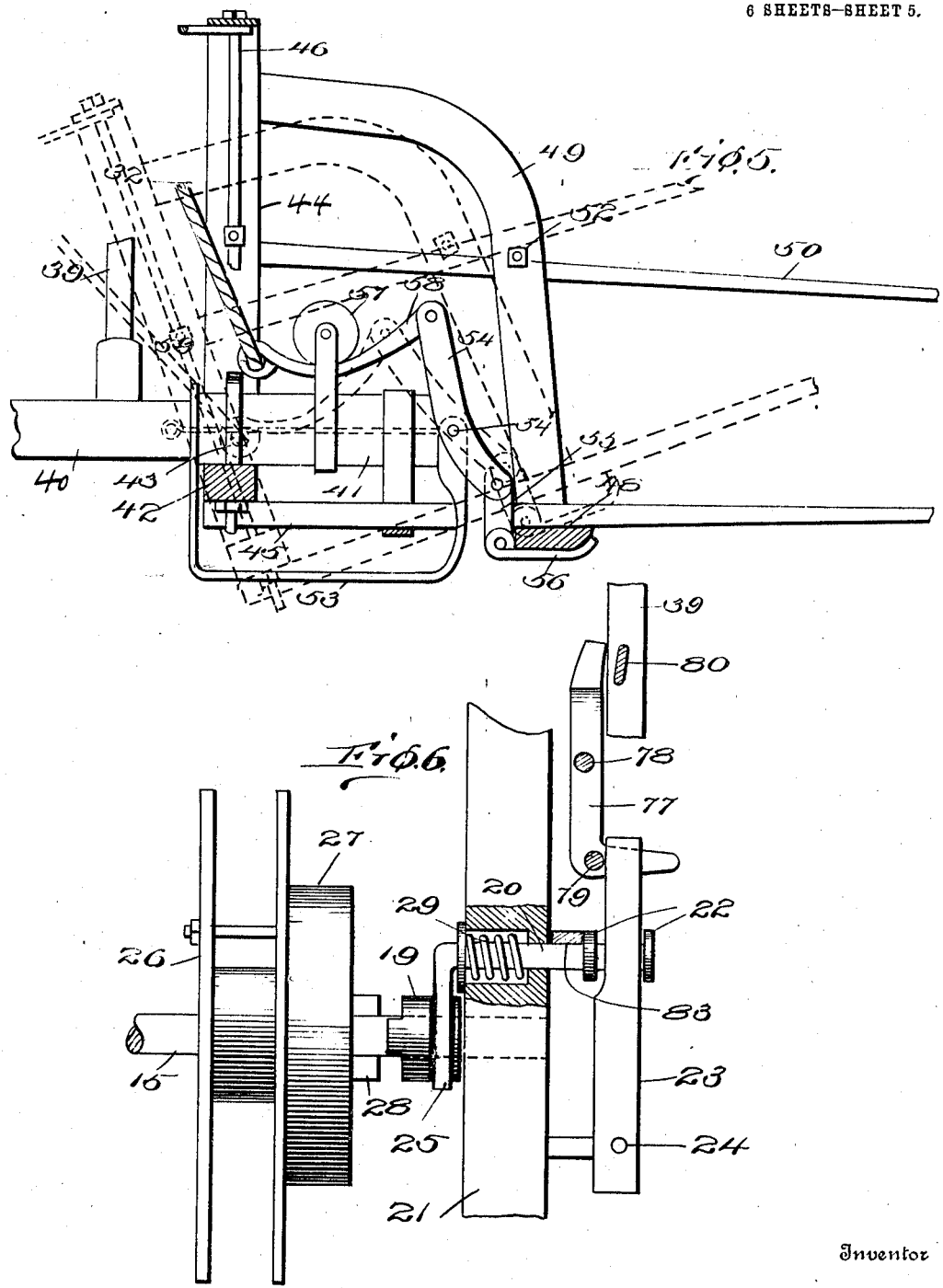

UNITED STATES PATENT OFFICE.

BENJAMIN F. WILSON, OF HASTINGS, NEBRASKA.

SHOCK-LOADER FOR GRAIN AND HAY.

980,038.

Specification of Letters Patent.

Patented Dec. 27, 1910.

Application filed March 19, 1909. Serial No. 484,510.

*To all whom it may concern:*

Be it known that I, BENJAMIN F. WILSON, a citizen of the United States, residing at Hastings, in the county of Adams and State of Nebraska, have invented certain new and useful Improvements in Shock-Loaders for Grain and Hay; and I do hereby declare the following to be a full, clear, and exact description of the invention, such as will enable others skilled in the art to which it appertains to make and use the same.

This invention relates to loading mechanism and while especially adapted for loading hay, grain and the like in shocks, is adapted also for loading other materials.

An object of the invention is to provide an improved structure mounted upon a vehicle and provided with a conveyer adapted to deliver the material to wagons driven along the side of the loader and with improved means for gathering the material from the ground and delivering it to the conveyer.

A further object of the invention is to provide in a loader a vehicle having means for picking up and elevating a shock of hay, grain or the like and dumping it from such elevating means into an inclined conveyer extending laterally from the vehicle.

A further object of the invention is to provide improved mechanism for controlling the movements of the elevator.

A further object of the invention is to provide improved mechanism for controlling the conveyor.

A further object of the invention is to provide means for gathering the material from the ground with improved means for controlling the positioning of such means.

With these and other objects in view, the invention comprises certain novel constructions, combinations and arrangements of parts as will be hereinafter fully described and claimed.

In the drawings:—Figure 1 is a view in rear elevation with parts of the vehicle broken away to show the operating mechanism. Fig. 2 is a top plan view of the complete machine. Fig. 3 is a longitudinal view with parts of the vehicle broken away to show the operating mechanism in side elevation. Fig. 4 is a view in side elevation enlarged showing the gearing for operating the elevator. Fig. 5 is an enlarged detail view of the end of the arm and connection with the elevator basket. Fig. 6 is an enlarged detail view of the means for throwing the elevator into and out of gear. Fig. 7 is a rear view of the loader, mast, derrick arm, etc., showing in full lines the elevator basket in position to engage a shock upon the ground and in various dotted line positions, the several positions assumed by the basket between the horizontal and the dumping positions.

Like characters of reference designate corresponding parts throughout the several views.

The improved loader forming the subject-matter of this application comprises a vehicle frame 10 supported upon traction wheels 11 preferably at the rear of the vehicle and forward wheels 12 adapted to be turned relative to the path of movement of the vehicle as in an ordinary wagon.

The traction wheels 11 are rotatably mounted upon an axle 13 with ordinary spring-actuated clutches 14 interposed between the wheels and the shaft, thereby permitting the vehicle to turn a corner as is customary in such implements. Forwardly of the axle 13 a shaft 15 is journaled in parallelism with the axle and is provided with a sprocket 16 over which runs a sprocket chain 17 upon a sprocket 18 rigidly mounted upon the axle so that as the axle 13 is rotated the shaft 15 is rotated therewith.

Splined and longitudinally movable upon the shaft 15 is a clutch member 19 controlled by a spring-actuated rod 20 extending outwardly through a bearing 21 and provided with spaced collars 22 upon the end opposite the clutch member 19 as shown more particularly in detail in Fig. 6. Upon the outer surface of the bearing 21 a lever 23 is pivoted as at 24 and embraces the rod 20 between the collars 22 so that as the lever 23 is moved the rod 20 is moved therewith and by means of the bifurcated end 25 moves the clutch member 19 longitudinally upon the shaft 15.

Loosely mounted upon the shaft 15 is a drum 26 to which are rigidly secured the brake disk 27 and the clutch member 28 proportioned for interaction with the clutch member 19 when the clutch member 19 is moved by the action of the spring 29 longitudinally upon the shaft 15.

Upon the frame 10 a mast 30 is erected having a sheave 31 at its upper end over which passes a rope or cable 32 which passes downwardly and about the drum 26. The mast 30 is supported by any approved means as the socket 33 and ring 34 whereby the mast may be stepped as found necessary.

Adjacent the base of the mast and the socket 33 and preferably integral with such socket a boom 35 is pivoted extending upwardly in length substantially equal to the height of the mast 30 when in upright position. The outward movement of the boom 35 is limited by means of a chain 36 or other flexible coupler connected with the mast 30 and outward movement of such boom is insured by means of a spring 37 connected at one end with the boom and at the other end with any convenient portion of the frame as shown particularly at Figs. 1 and 4. The boom is provided at its upper end with an idler 38 over and through which the cable 32 passes. Pivoted also preferably concentric with the boom 35 is a derrick arm 39 connected at its outer end with the curved rod 40 extending rearwardly to the rear of the frame, and pivoted there in such manner as to brace the derrick arm 39 against rearward movement but to permit the angular movement thereof upon its pivot. The curved rod 40 also extends forwardly beyond the derrick arm 39 and upon the extremity thereof is mounted a sleeve 41 rotatable upon such rod. Upon the sleeve 41 is mounted the elevator basket embodying the cross piece 42 secured to the sleeve 41 by means of a clip 43 embracing such sleeve and permitting a limited pivotal movement of the basket upon such clip. Upon the cross piece 42 an upstanding-frame-work 44 is erected serving as the rear wall of the elevator basket and secured to the cross piece in any approved manner. To the cross piece 42 are also secured a plurality of fingers 45 in any approved manner but preferably by means of rods 46 extending downwardly across the space between the frame 44 and the cross piece 42 through which such rods 46 extend and being curved about the fingers 45 extend upwardly through such cross piece and secured by means of nuts 47 by tightening which the fingers 45 are mounted in rigid association with the cross piece 42.

Extending across the several fingers 45 a cross piece 48 is secured in advance of the cross piece 42 and held rigid with the frame 44 by means of braces 49. Side fingers 50 are also preferably provided secured at their rearward ends to the frame 44 and intermediate their ends to the brace 49 in any approved manner as by clips 51 embracing such side fingers and provided with tension nuts 52. The basket is also preferably provided with a runner 53 rigidly secured to the sleeve 41.

At the forward end of the sleeve 41 a lever 54 is pivoted as at 54', connected by means of a link 55 and a keeper 56 with the cross piece 48 so that as the lever 54 is moved the cross piece 48 and the fingers 45 carried thereby are raised to a limited extent. Mounted also upon the sleeve 41 is an idler 57 under which extends a curved rod 58 having a hook 59 at its rearward end to which is attached the end of the cable 32 opposite the drum 26. It will thus be seen that the first movement upon the cable 32 will draw the curved rod 58 under the idler 57 and move the lever 54 to dotted line position thereby raising the basket with the fingers 45 to the dotted line position and away from the ground.

To the top of the frame 44 a link 59 is secured in such manner that by reason of the slot 60 at its outer end and a ring connection with the frame 44 a limited movement is provided to permit the basket to accommodate itself to the unevenness of the ground. The link 59 is connected with the frame work 10 by means of a short joint 61 to which it is pivoted as at 62, and the short joint 61 is pivoted as at 63 to the framework. The link 59 and short joint 61 in their combined lengths substantially equal the derrick arm 39 so that the elevator basket is maintained substantially in upright position during the greater portion of its upward movement on the well known principle of parallel levers. The short joint 61 and link 59 are held in alinement and to act as a single lever by means of a spring 64 which is attached at one end to the pivot 62 and at the opposite end to the mast 30 so that as the link raises, the spring 64 raises the short joint therewith and the link 59 rests in the stirrup 65. When, however, the short joint 61 is raised by the action of the spring 64 to the predetermined limit, further movement of such short joint is prevented by means of a chain 66 or other flexible connection, and the link 59 then moves angularly upon the pivot 62 and being shorter than the derrick arm 39 causes the elevator basket to tilt as shown in Fig. 1 to dump the contained load.

Above the frame-work 10 an inclined conveyer 67 is supported in any approved manner as by the uprights 68 and receives motion by means of a sprocket chain 69 from a shaft 70. The shaft 70 is preferably at right angles and geared to a shaft 71 by means of beveled gears 72 and the shaft 71 is driven from the shaft 15 by means of a sprocket chain 73 passing over a sprocket 74 upon the shaft 71 and a sprocket 75 upon the shaft 15. A clutch 76 is preferably provided by the manipulation of which the sprocket 75 may be thrown out of gear with the shaft 15 to stop the conveyer 67.

To operate the clutch consisting of the members 19 and 28 a lever 77 is preferably pivoted at 78 and is provided with a cross bar 79 bearing against the lever 23 which operates the clutch member 19. The derrick arm 39 is provided with a lug 80 disposed to engage the lever 77 and to move it pivotally when the derrick arm reaches the upward limit of its movement and with the basket tilted. In Fig. 1 the lug 80 is shown in engagement with the lever 77 and in readiness to throw such lever and the lever 23 connected therewith to disengage the clutch consisting of the members 19 and 28 as shown in Fig. 6. A lever 81 is pivoted as at 82 and provided with a pawl 83 adapted to engage between the bearing 21 and the sleeve 22 upon the rod 20 when the clutch is disengaged and a spring 84 is provided to automatically throw such pawl into engagement and to hold the clutch member separated. To disengage the pawl and permit the spring 29 to close the clutch a foot lever 85 is provided in position to be engaged by the foot of the operator and is connected by means of a link 86 so that as the top of the lever 85 is moved forwardly the pawl 83 is disengaged and the clutch closed by the spring 29. The closing of the clutch throws into operation and rotates the drum 26 and friction disk 27 and the rotation of the drum winds the cable 32 thereon raising the elevator basket as hereinafter described. When the basket has reached its upward limit and has been tilted to discharge its contents the lug 80 upon the derrick arm 39 automatically disengages the clutch and the spring 84 throws the pawl 83 into position to hold the clutch out of operation. This releases the drum 26 and the weight of the basket assisted by the spring 37 tends to return the basket to the ground. The downward movement of the elevator basket is controlled by means of a brake band 87 embracing the friction disk 27 and a bell-crank lever 88 is provided connected by means of a link 89 with a foot lever 90 in position to be operated by the operator and by which the descent of the elevator basket is controlled. It will thus be apparent that as the vehicle is driven along with a rack-carrying wagon beside and beneath the conveyer, a shock is encountered by the elevator basket and as soon as the same is safely within such basket the lever 85 is manipulated by the operator releasing the clutch composed of the members 19 and 28 whereby the drum 26 is rotated to wind the cable 32 and after first raising the points of the fingers of the basket from the ground the basket is raised upon an arc with the pivot of the derrick arm 39 as a center and dumped into the conveyer 67 as described.

The movement of the derrick arm 39 releases the clutch and the basket drops under the control of the band brake to the ground to repeat the operation when a subsequent shock of material is encountered.

What I claim is:—

1. In a device of the class described, a vehicle, a conveyer mounted thereon and extending laterally therefrom, a derrick arm pivoted to the vehicle, an elevator basket carried at the extremity of the derrick arm, a flexible member connected with the extremity of the derrick arm, and means carried by the vehicle to wind the flexible member.

2. In a device of the class described, a vehicle, a conveyer extending laterally therefrom, a derrick arm pivoted to the vehicle and extending laterally therefrom opposite the conveyer, an elevator basket carried at the extremity of the derrick arm, means to lift the derrick arm, means to maintain the basket in upright position during a portion of the lifting, and means to dump the basket above the conveyer at the completion of its movement.

3. In a device of the class described, a vehicle, a conveyer extending laterally therefrom, a derrick arm extending laterally from the vehicle opposite the conveyer, an elevator basket carried by the derrick arm, means to at times lift the derrick arm and basket carried thereby, and means operated by the derrick arm for throwing out of gear the lifting means.

4. In a device of the class described, a vehicle, a conveyer extending laterally at one side of the vehicle, a derrick arm pivoted to the vehicle and extending laterally opposite the conveyer, means carried by the derrick arm for engaging and lifting the material, means to lift the derrick arm, a manually controlled clutch adapted to at times operate the derrick-lifting means, and means carried by the derrick arm adapted to disengage the clutch.

5. In a device of the class described, a vehicle, a conveyer extending laterally from the vehicle, a derrick arm extending laterally from the vehicle opposite the conveyer, shock engaging means carried at the extremity of the derrick arm, parallel levers adapted to maintain the shock engaging means in upright position, and means to destroy the parallelism of the levers to dump the engaging means.

6. In a device of the class described, a derrick arm provided at its extremity with a bearing member, a basket carried by the bearing member, and disposed normally in a horizontal position, a cable adapted to raise the basket and derrick arm, and means whereby the initial pull upon the cable tilts the forward end of the basket upwardly.

7. In a device of the class described, a derrick arm, a bearing member carried at the extremity of the derrick arm, a lever pivoted upon the bearing member, a basket carried by the derrick arm and capable of limited movement relative thereto, a roller journaled upon the bearing member, a curved bar extending under the roller and connected with the lever, and a cable connected with the curved bar adapted to draw the lever toward the roller.

8. In a device of the class described, a wheeled vehicle, a conveyer extending laterally at one side of the vehicle, an elevator device extending laterally upon the opposite side of the vehicle, and means to raise and dump the elevator into the conveyer, such means including a pivoted arm comprising two sections pivotally connected, a stirrup connected with one of the sections and arranged to retain the other section at times in line with the first section whereby both the sections may be moved together, and a device for limiting the movement of one of the sections with reference to the other.

9. In a device of the class described, a derrick arm, a sleeve carried by and rotatable upon the derrick arm, an elevator basket carried by the sleeve and provided with a plurality of fingers positioned normally substantially horizontally, means permitting a limited movement of such fingers relative to the sleeve and from a normal position, a lever pivoted upon the sleeve, and having one end pivotally connected with the fingers, a roller journaled upon the sleeve, a curved bar having one end pivotally connected with the lever and extending under the roller, and a cable connected with the end of the curved bar opposite its pivot, and adapted to actuate the lever and raise the basket.

10. In a device of the class described, a derrick arm, a sleeve carried by and rotatable upon the derrick arm, a shoe carried rigidly by the sleeve, a cross bar carried by the sleeve adjacent the shoe and capable of oscillating movement thereon, a plurality of fingers carried rigidly by the cross bar, a stirrup carried by the fingers and embracing the sleeve, a second cross bar connecting the several fingers, a lever pivoted upon the sleeve and having one end pivotally connected to the last-mentioned cross bar, a curved bar pivotally connected with the lever, a roller journaled upon the sleeve and adapted to position the curved bar, and a cable connected with the curved bar adapted to move the end of the lever connected therewith toward the roller.

11. In a device of the class described, a derrick arm, a sleeve carried by and rotatable upon the derrick arm, a shoe carried rigidly by the sleeve and positioned to bear upon the ground, a cross bar carried by the sleeve and capable of oscillating movement relative thereto, a frame carried by the cross bar and extending above the sleeve, a plurality of fingers carried by and extending forwardly from the cross bar, other fingers carried by the frame extending above the first-mentioned fingers, a second cross bar extending transversely of the fingers, and rigidly connected with the side fingers, a lever pivoted upon the sleeve, a link connecting one end of the lever with the second-mentioned cross bar, a curved rod pivoted to the lever at the end opposite the link, a roller journaled upon the sleeve and adapted to position the curved bar, and a cable connected with the curved bar at its end opposite the pivot.

In testimony whereof I affix my signature in presence of two witnesses.

BENJAMIN F. WILSON.

Witnesses:
JOHN L. FLETCHER,
L. L. MARRIEL.